July 10, 1962  H. E. HOLLMANN  3,043,143
INTEGRATOR
Filed Jan. 27, 1959  3 Sheets-Sheet 1
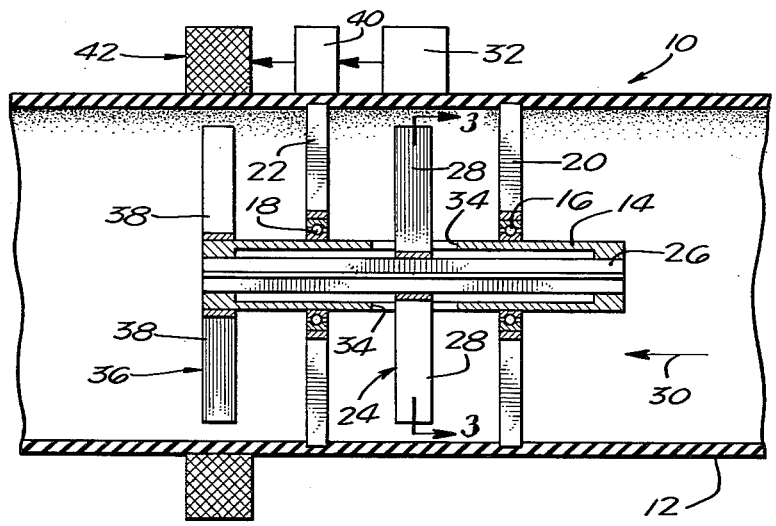
FIG. 1.
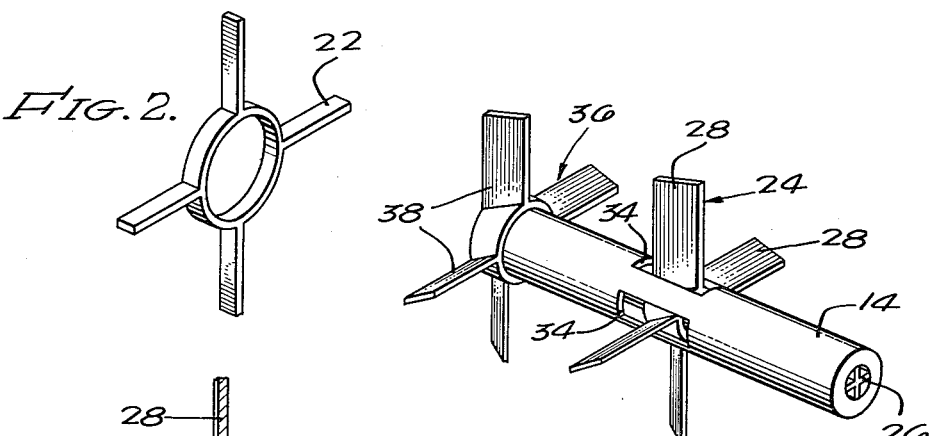
FIG. 2.
FIG. 4.
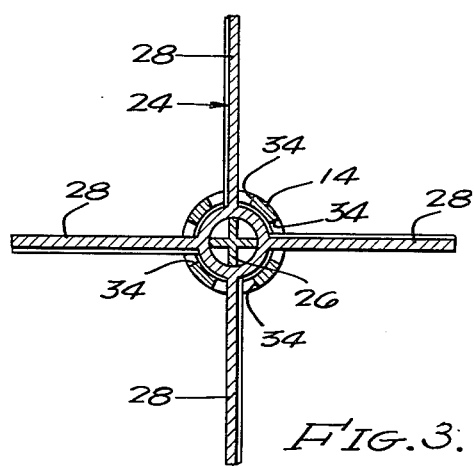
FIG. 3.
HANS E. HOLLMANN
INVENTOR.
BY Edward M Kendrick
ATTORNEY July 10, 1962 H. E. HOLLMANN 3,043,143
INTEGRATOR
Filed Jan. 27, 1959 3 Sheets-Sheet 2

HANS E. HOLLMANN
INVENTOR.

BY
ATTORNEY

United States Patent Office 3,043,143
Patented July 10, 1962

3,043,143
INTEGRATOR
Hans E. Hollmann, Studio City, Calif., assignor to Dresser Industries, Inc., Dallas, Tex., a corporation of Delaware
Filed Jan. 27, 1959, Ser. No. 789,343
9 Claims. (Cl. 73—231)

This invention relates to means for reducing the effect of bearing friction to a negligible value, and more particularly to integrators of the inertia type which incorporate members rotatably mounted in bearings to which a torque is applied in proportion to a signal to be integrated.

Such inertia-type integrators of the prior art rely on the physical laws that an angular acceleration is proportional to applied torque in accordance with the moment of inertia of the rotatable member about its axis, angular velocity is proportional to the integral angular acceleration, with respect to time, and angular displacement is proportional to the integral of angular velocity or proportional to the double integral of angular acceleration with respect to time. However, these integrators suffer from a serious error which, to the present time, has not been dealt with except by the use of low friction bearings to support the movable member in a rotatable position. This error is, in fact, due to bearing friction because bearing friction always subtracts from the applied torque regardless of the direction in which the torque is applied.

A fan-blade type flow meter, anemometer, or otherwise, incorporating a fan-blade type rotor rotatably mounted in bearings is a typical example of an integrator. Such a flowmeter may register fan rate of rotation produced by fluid flow in an axial direction against the blades thereof as an indication of the rate of fluid flow. The total flow in a given area will be indicated by the total angular displacement or total revolutions made by the blades. Ideally, for perfectly accurate measurement, the blades of this type of flowmeter should turn at a velocity exactly proportional to the fluid flow rate. However, as in the case of the above-mentioned inertia-type integrators of the prior art, this is not possible with such prior art flowmeters because some energy must be derived from the fluid flow to overcome bearing friction.

The present invention overcomes the above-described and other disadvantages of the prior art by providing support means; a first member movably carried on the support means; a second member; yielding means fixed between the first and second members to support the second member on and in a position movable relative to the first member; means to detect movement of the second member; and means responsive to the output of the detector means for moving the first member in a direction to reduce relative movement between the first and second members to zero. All of the means may take any one of several forms.

For example, a flowmeter made in accordance with the invention may have a construction including fixed support means; a shaft rotatably supported on the fixed support means; a bladed member; a torsion spring fixed at one point along its length to the shaft and fixed at another different point along its length to the bladed member, the bladed member having a predetermined pitch to rotate upon axial fluid flow through it; an electrical motor including a rotor fixed to the shaft, the electric motor having a number of rotor poles and a number of stator windings exactly equal to the number of blades of the bladed member, the bladed member having blades made of a ferromagnetic material; means including an inductive winding spaced from the blades to produce an approximately rectangular voltage wave when the blades of the bladed member pass contiguous thereto; means to produce pulses at the leading and trailing edge of the approximately rectangular voltage wave; and means including a flip-flop responsive to the pulses for impressing voltage pulses on the electric motor stator windings to operate the electric motor in a manner similar to a synchronous motor.

From the foregoing, it will be apparent that all friction loss will be due to a lack of damping, if none is provided, because when the outer rotary means is "slaved" to the inner rotary means in accordance with the present invention, little or no movement of the inner rotary means on the outer rotary means takes place and bearing friction is therefore no longer a problem. It is true in the case of the inegrator of the invention, that some torque is always required to create an angular displacement between the inner and outer rotary means to derive an error signal based upon which a control voltage may be applied to a servo motor to drive the outer rotary means; however, if an amplifier having a relatively high gain is used to produce an amplified voltage proportional to the angular displacement and to apply it to the servo motor, the torque required to produce the angular displacement will become negligible. Hence, in accordance with the invention, an unusually accurate integrator or flowmeter may be constructed which will operate substantially friction-free and more satisfactorily than any integrator or flowmeter made in accordance with the teachings of the prior art.

The invention will be better understood when considered in connection with the following description.

In the accompanying drawings which are to be regarded merely as illustrative:

FIG. 1 is a sectional view of a flowmeter made in accordance with the invention;

FIG. 2 is a perspective view of a supporting spider which may be used with the flowmeter shown in FIG. 1;

FIG. 3 is a sectional view taken on the line 3—3 of the flowmeter shown in FIG. 1;

FIG. 4 is a perspective view of a portion of the flowmeter shown in FIG. 1;

Figure 5:
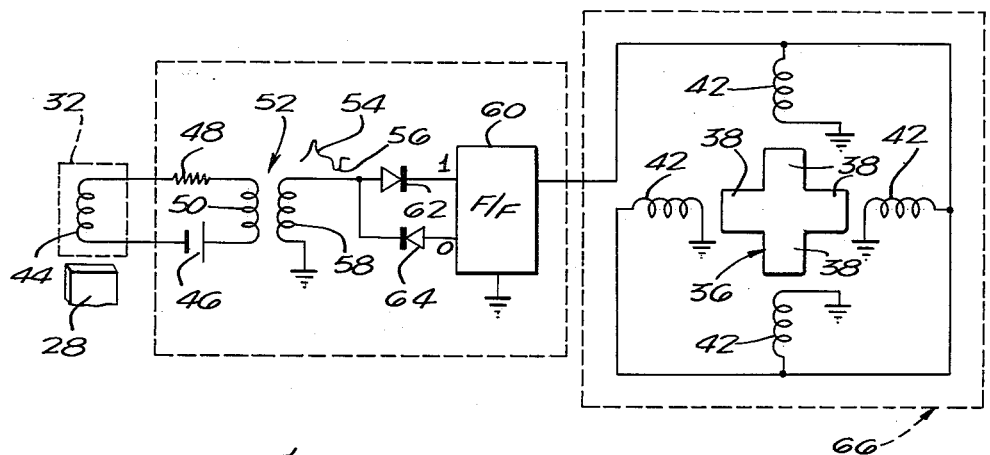
FIG. 5 is a schematic diagram of a control circuit employed with the flowmeter shown in FIG. 1.

As stated previously, a flowmeter is a type of integrator. Although the invention may be used as an anemometer, one embodiment of the invention, as shown in FIG. 1, may be employed as a meter to produce an output signal proportional to fluid flow through a conduit.

A flowmeter is indicated generally at 10 in FIG. 1 including a conduit 12, which may be made of a non-magnetic material, having an elongated hollow cylinder 14 rotatably supported in bearings 16 and 18 inside of spiders 20 and 22, respectively, fixed to the internal wall of conduit 12. A bladed member 24 is fixed to a torsion spring 26 that, in turn, is fixed to the opposite ends of cylinder 14. Bladed member 24 has a plurality of blades 28 having a predetermined pitch to be rotated about the longitudinal axis of torsion spring 26 by fluid flow in conduit 12 in the direction of an arrow 30. Conduit 12 may be made of a clear plastic or other material although the material of which it is made is dependent upon the type of means indicated generally at 32, which is employed to detect rotational movement of bladed member 24.

Perhaps, as best shown in FIGS. 3 and 4, blades 28 of bladed member 24 project outwardly through slots 34 in cylinder 14.

A second bladed member 36 is fixed to the left end of cylinder 14 as shown in FIG. 1 having blades 38 radially projecting therefrom. Spiders 20 and 22 may have a shape identical to the structure shown in FIG. 2.

Detector means 32 detects rotational movement of bladed member 24 and impresses an output signal on a control circuit 40 which, in turn, impresses a control voltage on four sets of windings indicated generally at 42 in FIG. 1 to rotate second bladed member 36 and cylinder 14 connected thereto substantially synchronously with the bladed member 28. It is to be understood that control circuit 40 will be adjusted to prevent the blades 28 of bladed member 24 from hitting the sides of corresponding slots 34. It is also to be noted in FIGS. 3 and 4 that torsion spring 26 is cross-shaped in cross section whereby little force is required to rotate bladed member 24 relative to cylinder 14 at small angles although a substantially greater force is required at larger angles. The spring constant characteristic of torsion spring 26 is not critical in accordance with the invention; however, if it is constructed with a cross-shaped cross section as shown in FIGS. 3 and 4, even less gain need be employed in the servo control circuit for rotating cylinder 14 through bladed member 36 substantially synchronously with bladed member 24. As explained previously, when cylinder 14 is driven via second bladed member 36 and electric motor stator windings 42 to overcome substantially all the friction of bearings 16 and 18m the angular displacement and rate of bladed member 24 will therefore be an unusually accurate measure of fluid flow in the direction of arrow 30.

The control circuit for the embodiment of the invention shown in FIG. 1 is illustrated in FIG. 5 including an inductor coil 44 in detector 32. It is to be noted that preferably both bladed members 24 and 36 have blades 28 and 38, respectively, made of a ferromagnetic material. Hence, when a blade 28 of bladed member 24 passes contiguous to inductor 44, its inductance will change. Direct current is supplied to inductor 44 by means of a battery 46 connected serially with a resistor 48 and the primary winding 50 of a transformer 52. Thus, when inductance of inductor 44 increases a pulse is generated as blade 28 passes contiguous thereto which is converted to positive and negative pulses indicated at 54 and 56 at the output of secondary winding 58 of transformer 52. The positive pulses are employed to set a flip-flop 60 to the "one" state when its output is high and the negative pulses 56 are employed to set the flip-flop 60 to a "zero" state. Positive and negative pulses 54 and 56, respectively, are separated from each other by means of suitable diodes 62 and 64, respectively. The output of flip-flop 60 is impressed upon windings 42. Windings 42 with bladed member 36 thus form the stator and rotor, respectively, of an electric motor which is indicated generally at 66 in FIG. 5. Motor 66 is not a true synchronous motor but operates in a substantially analogous manner. It is to be noted that in a true synchronous motor, the rotor is made of permanent magnets having peripheral poles alternately north and south. In this case too, the energization of the stator windings thereof would be performed by passing current alternately first in one direction therethrough and then in the other opposite direction. A conventional synchronous motor may, in fact, be employed with the invention. All that is necessary to employ a synchronous motor would be to filter the waveform of pulses 54 and 56 and to derive the fundamental frequency signal component thereof to drive a synchronous motor.

Figure 6:
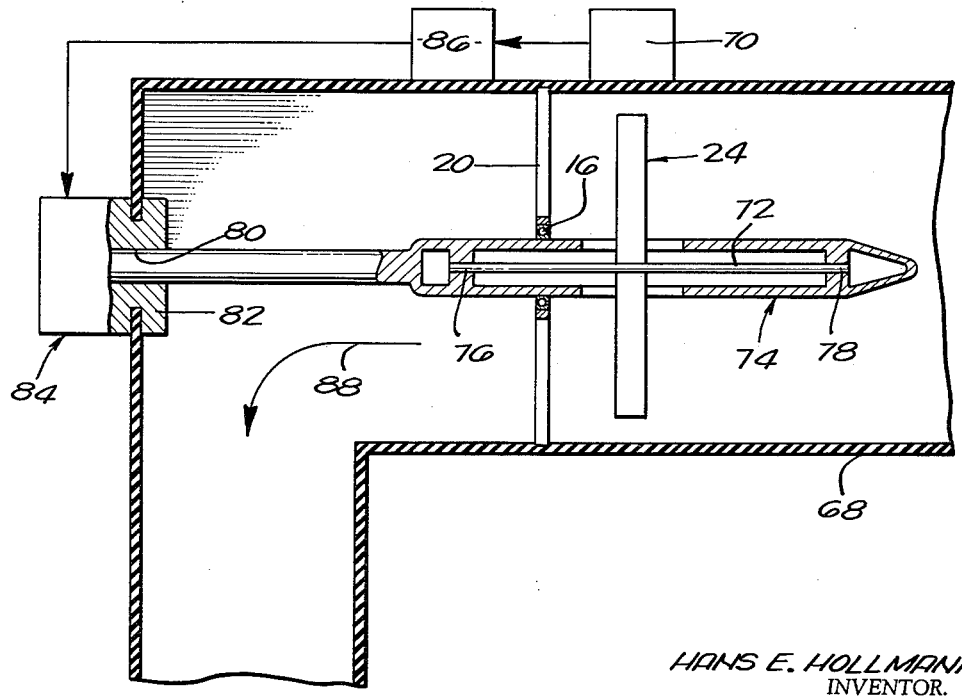
FIG. 6 is a sectional view of another embodiment of the invention.

An alternative embodiment of the invention is shown in FIG. 6 including a conduit 68 which is preferably made of a clear plastic material because of a particular detector means 70 employed therewith to detect rotation of bladed member 24 inside conduit 68. Bladed member 24 shown in FIG. 6 is simply supported from a cylindrical torsion shaft 72 that is fixed to a hollow cylinder 74 at its opposite ends 76 and 78. Shaft 74 is supported in a single set of bearings 16 inside spider 20 in a manner similar to the mounting of cylinder 14 in bearings 16 shown in FIG. 1. The left end of shaft 74 is rotatably supported in fluid tight bearings 80 in a servo motor housing 82 of a servo motor 84. Servo motor 84 is operated by a control circuit 86 as will be explained subsequently. Fluid flow is in the direction of arrow 88 shown in FIG. 6.

Figure 7:
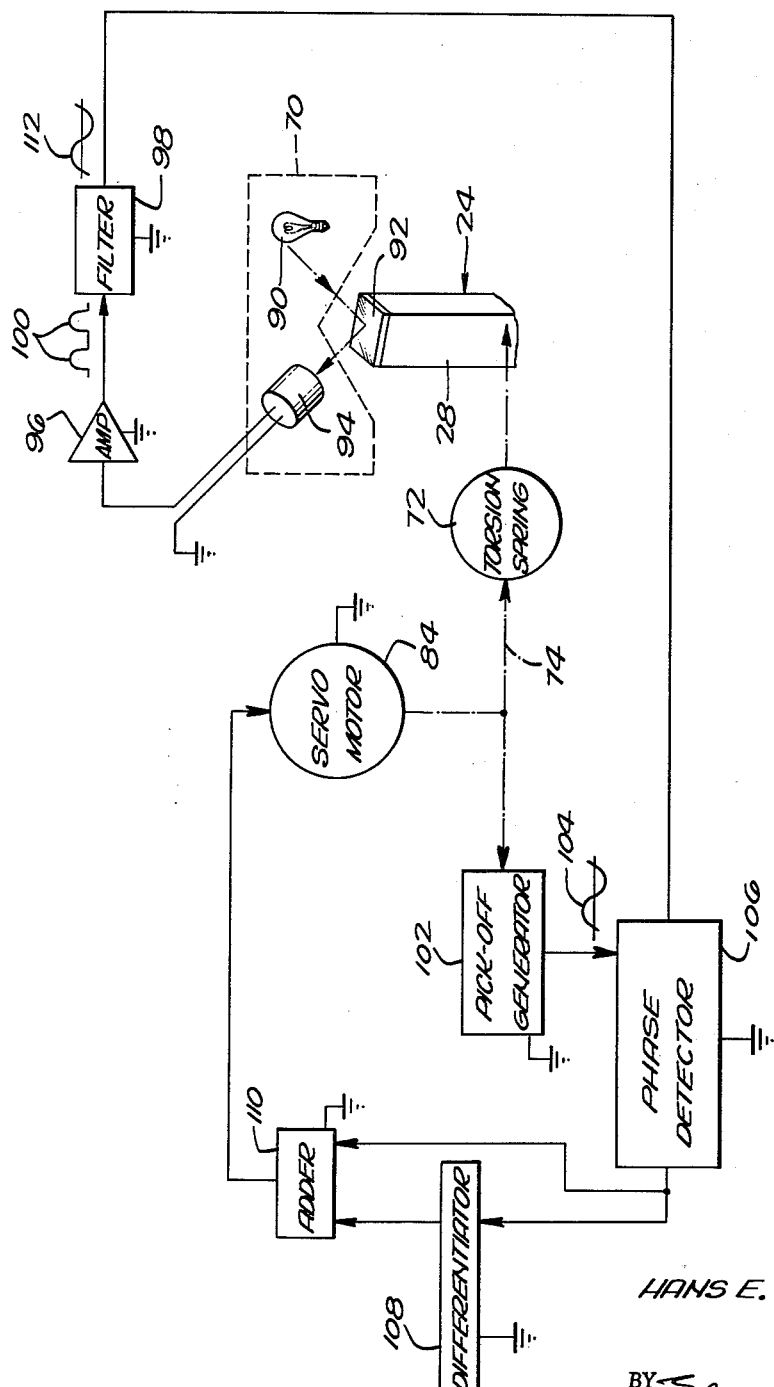
FIG. 7 is a diagrammatic view of the control circuit for the flowmeter shown in FIG. 6.

The construction and mode of operation of control circuit 86 will be better understood when considered in connection with FIG. 7. In FIG. 7, detector means 70 comprises a lamp 90 to illuminate preferably white reflecting surface 92 on the ends of the blades 28 of bladed member 24, the light from lamp 90 being reflected from surface 92 to a photocell 94 of detector means 70. The output of photocell 94 is impressed upon an amplifier 96, the output of which is impressed upon a filter 98. Filter 98 filters out the harmonic components of the pulses indicated at 100 at the output of amplifier 96 produced by periodic reflection of light from surfaces 92 on blades 28 to photocell 94. Servo motor 84 is mechanically connected to a pick-off generator 102. Pick-off generator 102 is mechanically connected to servo motor 84 as well as to torsion spring 72 through shaft 74. Pick-off generator 102 simply produces an alternating signal indicated at 104 having a phase corresponding to the angular position of shaft 74. The outputs of filter 98 and pick-off generator 102 are compared in a phase detector 106 which produces an output signal proportional to the difference in phase thereof. The output of phase detector 106 is differentiated by differentiator 108. The output of both phase detector 106 and differentiator 108 are then added together in an adder 110 which is employed to drive servo motor 84.

Thus, in accordance with the invention cylinder 14 or shaft 74 is "slaved" by a type of servo mechanism to the angular position of bladed member 24. This means that if there is a high gain in the servo loop, for example, if the gain of the amplifier 96 shown in FIG. 7 is high, the amount of energy derived from fluid flow in the direction of either arrow 30 or arrow 88 will be negligible in that the angular position and rate of rotation of bladed member 24 in either FIGS. 1 or 6, will be a nearly perfect indication of the total flow and rate of flow through conduits 12 and 68.

Normally, a servo mechanism compares a controlled device output signal to a standard and corrects the device. It may not be entirely obvious how control circuit shown in FIG. 6 operates as a true servo mechanism although it will be obvious from FIG. 7 that the standard provided in FIG. 7 is the phase of signal 104 which is compared with the output of filter 98 indicated at 112.

The control circuit of FIG. 5 is an unusual servo mechanism in that the signal applied to stator windings 42 is actually the reference signal. The signal to be compared is the angular position of second bladed member 36. Thus, if second bladed member 36 rotates synchronously with the square voltage waves applied to stator windings 42, no unbalanced torque is applied to accelerate or decelerate second blade member 36. However, if second bladed member 36 is behind in phase, it is accelerated by the application of the square voltage waves to stator windings 46 and is decelerated if it is leading in phase with respect to the reference voltage wave applied to stator windings 42.

As in any electromechanical servo mechanism, damping is always a problem. Thus, a differentiator 108 is employed in the control circuit of FIG. 7 simply to eliminate large oscillatory movement of bladed member 24 relative to shaft 74 or vice versa.

It is to be noted that in the flowmeter of the invention, the member having the blades with the greatest pitch may have a number of blades which is either a multiple or sub-multiple of the poles of the motor when motor excitation is determined by passage of the blades contiguous to the blade position detector means. In such a case, the discrepancy between the number of blades and number of poles may be taken care of by a frequency divider or multiplier or by gear reduction. Response time may be improved by operating a 400 or 4000 cycles per second alternating current source for the motor by detector means responsive to blade movement. For example, if the source is an x40 frequency multiplier and 10 blades are employed a 1:40 gear reduction must be made from the motor output shaft to the flowmeter if the blades and poles are equal in number, but 1:20 if there are, for example, 20 poles.

To say it another way, the motor must have a number of poles $an$ where $$a = \frac{2}{n} \text{ or } \frac{3}{n} \cdots \text{ or } \frac{K}{n}$$

and $n$ is the number of blades of the bladed member and $K$ is any positive integer larger than unity.

Still further, a torsion spring may be mounted in several ways to practice the invention although only those of FIGS. 1 and 6 have been illustrated.

The word "integrator" is hereby defined for use in the title and in the specification including the description and the claims, as an analog computer type device where, for example, a shaft input as indicated in FIG. 1.11 on page 15 of a book, "Electric Analog Computers," by A. Granino and Theresa M. Korn, 1st ed. (McGraw-Hill, 1952), to a servo multiplier is disclosed. For example, sometimes integrators are thought of as devices for producing indications as well as in fact integrating input signals. However, it will be noted that in accordance with "The International Dictionary of Physics and Electronics" (D. Van Norstrand Company, Inc., 1956), that "integrating meters" are defined differently than an integrator. Still further, a non-indicating integrator is shown on page 18 of the said "Electronic Analog Computers" book.

Although only a few specific embodiments of the invention have been shown and described, many changes and modifications will, of course, suggest themselves to those skilled in the art. Thus, the invention is not to be limited to the embodiments illustrated, the true scope thereof being defined only in the appended claims.

What is claimed is:

1. A flowmeter comprising: support means; an outer shaft rotatable on said support means; an inner shaft fixed at a first predetermined point along its length to said outer shaft; a bladed member fixed to said inner shaft at a second predetermined point spaced from said first predetermined point; means to detect rotation of bladed member; and means responsive to the output of said detector means for moving said outer shaft in a direction tending to reduce relative rotation between said shafts to zero.

2. A flowmeter comprising: fixed support means; outer rotary means having a hollow rotor; bearing means between said fixed support means and said outer rotary means; a bladed member having a predetermined pitch to rotate on axial flow of a fluid thereagainst; inner rotary means fixed at one point along its length to said outer rotary means and fixed at different points along its length to said bladed member; means to detect angular displacement between said bladed member and said outer rotary means; and means responsive to the output of said detector means for rotating said outer rotary means in a direction tending to reduce said angular displacement to zero.

3. A flowmeter comprising: fixed support means; a hollow cylindrical shaft rotatable on said fixed support means; an elongated torsion spring member fixed at first and second points along its length to said hollow shaft and mounted concentrically therewith, said hollow shaft having slots intermediate said first and second points; a bladed member fixed to said torsion member having a blade thereof protruding outwardly through said hollow shaft slots; means to detect angular displacement between said bladed member and said hollow shaft; and means responsive to the output of said detector means for rotating said hollow shaft in a direction tending to reduce said angular displacement to zero.

4. A flowmeter comprising: fixed support means; a hollow cylindrical shaft having a cross-shaped cross section rotatable on said fixed support means; an elongated torsion spring member fixed at first and second points along its length to said hollow shaft and mounted concentrically therewith, said hollow shaft having slots intermediate said first and second points; a bladed member fixed to said torsion member having a blade thereof protruding outwardly through said hollow shaft slots; means to detect angular displacement between said bladed member and said hollow shaft; and means responsive to the output of said detector means for rotating said hollow shaft in a direction tending to reduce said angular displacement to zero.

5. A flowmeter comprising: a conduit; a pair of spiders fixed to said conduit in spaced relation; bearing means inside said spiders; a hollow shaft having slots extending radially through it at a point along its length, said hollow shaft being rotatably mounted in said bearings; a bladed member having a predetermined pitch to rotate upon axial fluid flow against the blades thereof; an elongated torsion spring member fixed at first and second different points along its length to said hollow shaft and mounted concentrically therewith, said bladed member being fixed to said torsion member at a third point intermediate said first and second points having the blades thereof extending radially outwardly through the slots of said hollow shaft; an electric motor rotor fixed to said hollow shaft; means to detect angular displacement between said bladed member and said rotor; and means responsive to the output of said detector means for rotating said rotor in a direction tending to reduce said angular displacement to zero.

6. A flowmeter comprising: fixed support means; a shaft rotatably supported on said fixed support means; a bladed member; a torsion spring fixed at one point along its length to said shaft and fixed at another different point along its length to said bladed member and mounted concentrically therewith, said bladed member having a predetermined pitch to rotate upon axial fluid flow through it; an electric motor including a rotor fixed to said shaft, said electric motor having a number of rotor poles and a number of stator windings exactly equal to the number of blades of said bladed member, said bladed member having blades made of a ferromagnetic material; means including an inductive winding spaced from said blades to produce an approximately rectangular voltage wave when the blades of said bladed member pass contiguous thereto; means to produce pulses at the leading and trailing edge of said approximately rectangular voltage wave; and means including a flip-flop responsive to said pulses for impressing voltage pulses on said electric motor stator windings to operate said electric motor in a manner similar to a synchronous motor.

7. A flowmeter comprising: fixed support means; a hollow cylinder; bearing means to support said hollow cylinder rotatably from said support means; a bladed member having a predetermined pitch to rotate upon fluid flow in an axial direction thereagainst; a ferromagnetic rotor fixed to said hollow cylinder having a number of variations of radius equal to and where $$a = \frac{2}{n} \text{ or } \frac{3}{n} \cdots \text{ or } \frac{K}{n}$$

$n$ is the number of blades of said bladed member, and $K$ is any positive integer greater than unity; a torsion shaft fixed at one position along its length to said hollow cylinder and fixed at another point along its length to said first bladed member and mounted concentrically therewith; means on said support means at a first fixed point around said bladed member to generate an electrical output pulse when a blade of said bladed member passes said first fixed point around said rotor connected to said pulse generator means for rotating said rotor in a manner similar to that in which a synchronous motor rotor is driven.

8. A flowmeter comprising: fixed support means; a hollow cylindrical shaft rotatable on said fixed support means; an elongated torsion spring member fixed at first and second points along its length to said hollow shaft and mounted concentrically therewith, said hollow shaft having slots intermediate said first and second points; a bladed member having a predetermined pitch fixed to said torsion member having a blade thereof protruding outwardly through said hollow shaft slots; detector means peripherally positioned about said bladed member to produce an output pulse each time a blade thereof passes contiguous thereto; a filter to produce an alternating output signal of a fundamental frequency equal to the fundamental harmonic component of output pulses produced by said detector means; a servo motor to rotate said shaft; a pick-off generator for producing an alternating signal proportional to the angular displacement of said servo motor; and a phase detector for impressing an output signal on said servo motor to apply torque to the output shaft thereof proportional to the difference between the phase of the alternating output signal of said filter and the alternating output signal of said pick-off generator.

9. A flowmeter comprising: fixed support means; a hollow cylindrical shaft rotatable on said fixed support means; an elongated torsion spring member fixed at first and second points along its length to said hollow shaft and mounted concentrically therewith, said hollow shaft having slots intermediate said first and second points; a bladed member having a predetermined pitch fixed to said torsion member having a blade thereof protruding outwardly through said hollow shaft slots; detector means peripherally positioned about said bladed member to produce an output pulse each time a blade thereof passes contiguous thereto; a filter to produce an alternating output signal of a fundamental frequency equal to the fundamental harmonic component of output pulses produced by said detector means; a servo motor to rotate said shaft; a pick-off generator for producing an alternating signal proportional to the angular displacement of said servo motor; a phase detector for producing an output signal proportional to the difference in phase of the output signal of said filter and the output signal of said pick-off generator; an adder; a differentiator responsive to the output of said phase detector for impressing an input signal on said adder, the output of said phase detector also being impressed upon said adder, the output of said adder being connected to said servo motor to apply torque to said shaft in proportion to the output of said phase detector and in proportion to the rate of change of the output of said phase detector.

References Cited in the file of this patent
UNITED STATES PATENTS

| | | |
|---|---|---|
| 2,045,994 | Pliasted | June 30, 1936 |
| 2,355,921 | Mercier | Aug. 15, 1944 |
| 2,406,723 | Von Hortenau | Aug. 27, 1946 |
| 2,742,783 | Jasse | Apr. 24, 1956 |

FOREIGN PATENTS

| | | |
|---|---|---|
| 758,094 | Great Britain | Sept. 26, 1956 |